United States Patent Office 3,114,675
Patented Dec. 17, 1963

3,114,675
3α-(α-TRIMETHYLAMMONIO - ACETOXY) - 20 - BIS-(NITRATOMETHYL)-21-NITRATO-5β-PREGNANE-11-ONE HYDROXIDE AND ACID SALTS THEREOF
Daniel Bertin, Montrouge, France, assignor to Roussel-UCLAF, Paris, France, a corporation of France
No Drawing. Filed Oct. 30, 1962, Ser. No. 234,231
Claims priority, application France Nov. 13, 1961
7 Claims. (Cl. 167—65)

The invention reltaes to the novel quaternary ammonium compounds having the formula

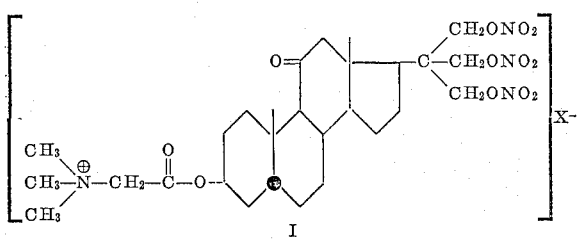

wherein X is a monovalent anion selected from the group consisting of a hydroxyl group and the anion of non-toxic mineral and organic acids and a process for the preparation of the said compounds. The invention also relates to a method of treating spasms of vascular, coronary or visceral origin and to compositions for the treatment of spasms of vascular, coronary and visceral origin.

The compounds of Formula I have interesting pharmacological properties and particularly possess a very pronounced spasmolytic and vasodilatatory activity. The vasodilatatory activity is principally felt on the coronary blood vessels and the peripheric capillary system. The compounds of Formula I are useful in the treatment of angina of the chest and coronaritis, asthma, bronchial spasms, arterial spasms and visceral spasms.

It is an object of the invention to provide the novel quaternary ammonium compounds of Formula I.

It is another object of the invention to provide a novel process for the preparation of the quaternary ammonium compounds of Formula I.

It is a further object of the invention to provide novel compositions for the treatment of spasms of vascular, coronary and visceral origin.

It is an additional object of the invention to provide a novel method for the treatment of spasms of vascular, coronary and visceral origin.

These and other objects and advantages of the invention will become obvious from the following detailed description.

The novel quaternary ammonium compounds of the invention have the formula

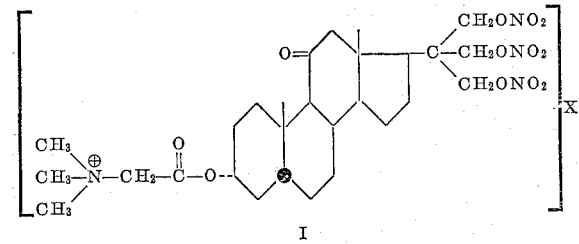

wherein X is a monovalent anion selected from the group consisting of hydroxyl group and an anion of pharmaceutically acceptable, non-toxic mineral and organic acids.

Examples of suitable pharmaceutically acceptable, non-toxic acids from which the anion of Formula I can be derived are organic acids such as methane sulfonic acid, tartaric acid, citric acid, phthalic acid, etc. and mineral acids such as hydrochloric acid, hydrobromic acid, sulfuric acid, phosphoric acid, etc.

The process of the invention for the preparation of the quaternary ammonium compounds comprises reacting 20-bis - (nitratomethyl) - 21 - nitrato - 5β - pregnane - 3α-ol-11-one with trimethyl-(methylcarbohalide)-ammonium hydroxide on a mineral or organic acid salt thereof in the presence of a base such as a tertiary amine to form 3α-[α-trimethylammonioacetoxy]-20 - bis - (nitratomethyl)-21-nitrato-5β-pregnane-11-one hydroxide or an acid salt thereof and recovering the latter.

A preferred mode of the process of the invention comprises reacting 20-bis-(nitratomethyl)-21-nitrato-5β-pregnane-3α-ol-11-one with trimethyl-(methylcarbochloride)-ammonium chloride to form the chloride of 3α-[α-trimethylammonio-acetoxy] - 20 - bis - (nitratomethyl)-21-nitrato-5β-pregnane-11-one and recovering the latter. The reaction scheme is illustrated in Table I.

TABLE I

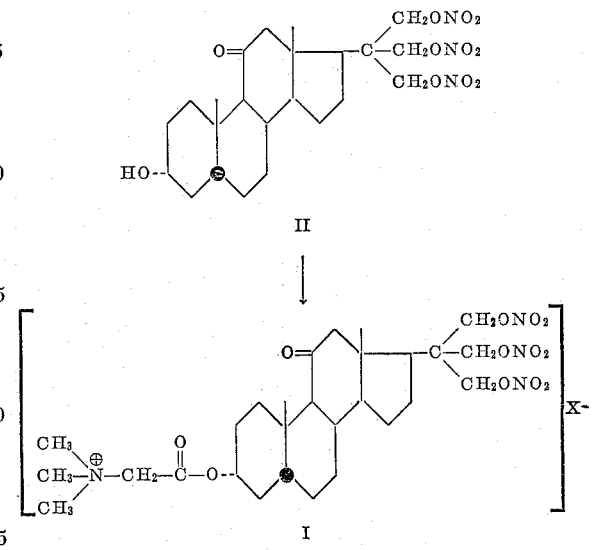

wherein X has the above definition.

The novel compositions of the invention for the treatment of spasms of vascular, coronary and visceral origin are comprised of a quaternary ammonium compound having the formula

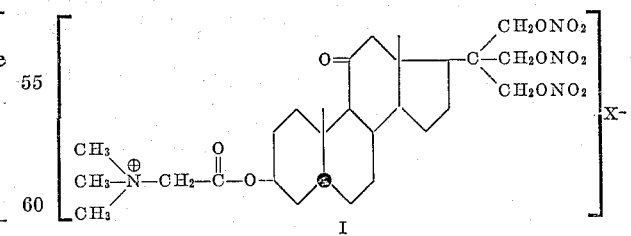

wherein X is a monovalent anion selected from the group consisting of a hydroxyl group and an anion of pharmaceutically acceptable, non-toxic mineral and organic acids and a pharmaceutical carrier. The compositions may be in the form of aqueous injectable solutions, prepared in ampules, in multiple dose flacons, in the form of tablets and suppositories prepared in the usual manner.

The novel method of the invention for treating spasms of vascular, coronary and visceral origin comprises administering an effective amount of a quaternary ammonium compound having the formula

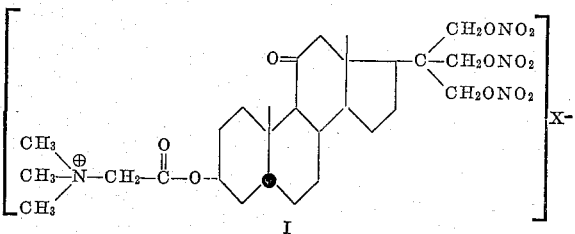

wherein X is a monovalent anion selected from the group consisting of a hydroxyl group and an anion of pharmaceutically acceptable, non-toxic organic and mineral acids. The quaternary ammonium compounds can be administered orally, transcutaneously or rectally. The useful daily dose is between 1 and 25 milligrams depending upon the method of administration.

The starting material, 20 - bis - (nitratomethyl)-21-nitrato-5β-pregnane-3α-ol-11-one, can be prepared according to the process of the commonly assigned, co-pending application Serial No. 174,692, filed February 21, 1962, which comprises oxidizing $\Delta^{17(20)}$-5β-pregnene-3α,21-diol-11-one to form $\Delta^{17(20)}$-5β-pregnene-3α-ol-11-dione, esterifying the latter acetic acid to form 3α-acetoxy-$\Delta^{17(20)}$-5β-pregnene-11,21-dione, catalytically hydrogenating the latter in the presence of palladized carbon to form 3α-acetoxy-5β-pregnane-11,21-dione, condensing the latter with formaldehyde under alkaline conditions to form a mixture of 3α-acetoxy-20-bis-(hydroxymethyl)-5β-pregnene-21-ol-11-one, 3α-acetoxy-20-hydroxymethyl-5β-pregnane-21-ol-11-one and 3α-acetoxy-20-methylene-5β-pregnane-11,21-dione, recovering 3α-acetoxy-20-bis-(hydroxymethyl)-5β-pregnane-21-ol-11-one by crystallization from an organic solution of the said mixture, reacting the latter with fuming nitric acid at $-5°$ to $-15°$ C. to form 3α-acetoxy-20-bis-(nitratomethyl)-21-nitrato-5β-pregnane-11-one and saponifying the latter to form 20-bis-(nitratomethyl)-21-nitrato-5β-pregnane-11-one.

In the following example there is described a preferred embodiment to illustrate the invention. However, it should be understood that the invention is not intended to be limited to the specific embodiment.

EXAMPLE

*The Chloride of 3α-[α-Trimethylammonio-Acetoxy]-20-Bis-(Nitratomethyl)-21-Nitrato-5β-Pregnane-11-One*

20 gm. of trimethyl - (methylcarboxy) - ammonium chloride and 30 gm. of phosphorous pentachloride were introduced into 40 cc. of phosphorous oxychloride. The mixture was heated for a period of about an hour and a half under agitation in an oil bath at a temperature of 85° to 90° C. The mixture was then vacuum filtered rapidly while hot and allowed to cool in the absence of humidity and to stand for crystallization. The crystals formed were vacuum filtered, redissolved in phosphorous oxychloride at 85° to 90° C. and cooled. The crystals were vacuum filtered under nitrogen, rinsed successively with phosphorous oxychloride and chloroform, dried over phosphorous pentoxide, then under vacuum. 12 gm. of trimethyl - (methylcarbochloride) - ammonium chloride were obtained.

2 gm. of 20-bis-(nitratomethyl)-21-nitrato-5β-pregnane-3α-ol-11-one, 2 cc. of pyridine and 2 gm. of trimethyl-(methylcarbochloride)-ammonium chloride were introduced into 40 cc. of chloroform and the resulting mixture was held at 45° C. for 30 minutes before heating to reflux for 75 minutes. The reaction mixture was then cooled and poured into 60 cc. of concentrated saline water containing 2.5 gm. of sodium bicarbonate.

This mixture was cooled by an ice bath and extracted with chloroform. The chloroform extracts were washed with saturated saline water and the chloroformic solution was then dried, filtered and distilled under a slight vacuum. The raw chloride of 3α-[α-trimethylammonio-acetoxy] - 20-bis-(nitratomethyl)-21-nitrato-5β-pregnane-11-one was obtained by chromatography through silica gel with elution with methylene chloride containing 30% of methanol. Its purification was effected by recrystallization from a mixture of methylene chloride and ether. 1.317 gm. of the product having a melting point of 215–220° C. (with decomposition) and a specific rotation $[\alpha]_D^{20} = +45.4°$ (chloroform) were obtained.

The product was colorless and hygroscopic. It was soluble in acetone, chloroform, 20% ethanol, soluble in hot water and insoluble in ether.

The I.R. spectra (chloroform) showed the presence of the —$ONO_2$ group, the presence of a non-conjugated ketone and the presence of a band at 1746 cm.$^{-1}$ corresponding to an ester group.

This compound is not described in the literature.

PHARMACOLOGICAL DATA ON THE CHLORIDE OF 3α-[α-TRIMETHYLAMMONIO-ACETOXY]-20-BIS - (NITRATOMETHYL)-21-NITRATO-5β-PREGNANE-11-ONE

A. *Action on Coronary Blood Flow*

The study of the action of the compound of the example on coronary blood flow was made on the isolated rabbit heart utilizing a technique inspired by Langendorff (Arch. Gesam, Physiol. 1895, 61, 291). In this method, the heart was suspended by the aorta to a cannula and the coronary system was perfused by means of this cannula under a constant pressure of 5 cm. of mercury by Locke serum at a pH of 7.2 to 7.3 and a temperature of 37° C.

The compound studied was placed in solution in water and this solution was diluted by means of Locke serum to a convenient concentration. On the proper apparatus, the coronary blood flow and the ventricular contractions were measured. The minimum concentration of the compound which clearly augmented the coronary blood flow of such a preparation was systematically determined and Table I shows the results obtained with the compound of the example as well as with trinitrine and papaverine under the same experimental conditions.

TABLE I

| Compound studied | Minimal active concentration in μg./cm. in perfusion liquid | Increase of coronary blood flow in percent of normal blood flow | Duration of action in minutes | Effect on the ventriculary contractions | |
|---|---|---|---|---|---|
| | | | | On the amplitude | On the frequency |
| Trinitrine | 1 | 10 | 30 | 0 | −5 |
| Papaverine hydrochloride | 10 | 20 | 15 | 0 | 0 |
| The chloride of 3 α-[α-trimethylammonio-acetoxy]-20-bis-(nitratomethyl)-21-nitrato-5β-pregnane-11-one. | 0.001 | 10 | +30 on the level | 0 | 0 |

On the isolated rabbit heart intoxicated with a solution containing 50 mg./liter of barium chloride, the minimal dose of the product of the example susceptible of removing the spasm caused by the intoxication was 0.01 gamma/cm. This dose simultaneously increased the coronary blood flow 30%. Increasing the dose of the product of the example in the perfusion liquid to 0.1 gamma/cc. increased the coronary blood flow by 50 to 100% and 1 gamma/cc. increased the coronary blood flow by 300%.

B. *Action on the Isolated Intestine of the Guinea Pig*

The chloride of 3α-[α-trimethylammonio-acetoxy]-20-bis-(nitratomethyl)-21-nitrato-5β-pregnane-11-one was essayed in the test of the contracture of the isolated intestinal loop provoked by:

(1) Barium chloride
(2) Acetylcholine
(3) Histamine

With reference to the three contracturing agents, the minimum concentrations necessary on one hand to provoke the decontraction of the organ and on the other hand to inhibit the action of a new dose of a contracturing agent were determined and are summarized in Table II.

TABLE II

| Tests | Barium chloride | Acetylcholine | Histamine |
|---|---|---|---|
| Minimum dose for decontraction, γ/cc | 2 | 3 | 5 |
| Minimum dose for inhibition, γ/cc | 2 | 5 | 10 |

The chloride of 3α-[α-trimethylammonio-acetoxyl]-20-bis - (nitratomethyl) - 21-nitrato-5β-pregnane-11-one is about 10 to 15 times more active than papaverine for this test.

C. *Peripheric Vasodilatatory Effect*

The peripheric vasodilatatory effect of the chloride of 3α - [α-trimethylammonio-acetoxy]-20-bis-(nitratomethyl)-21-nitrato-5β-pregnane-11-one was studied on the rabbit paw in situ according to a technique inspired by that described by Binet et al. (Presse Medicale, 1949, p. 445). The animal was anesthetized with urethane and treated with heparine. The paw was isolated from the circulation by a ligature of the upper end of the femoral artery. An amount of blood sucked out of the carotid artery was perfused at a constant flow by means of a Jouvelet transfusion apparatus into the femoral artery of the isolated paw. The perfused artery was besides connected with a Ludwig manometer which records the pressure in this artery and thus informs eventually about the vasodilatation or the vasoconstriction. A peripheric vasoconstriction was realized by the intravenous injection of barium chloride.

3α - [α - trimethylammonio-acetoxy]-20-bis-(nitratomethyl)-21-nitrato-5β-pregnane-11-one administered by venous methods at a dose of 500 gammas/kg. produced a clear vasodilatatory effect.

D. *Effect on the Coronary Blood Flow in Dogs*

Vasodilatatory effect on the coronary circulation in situ in dogs anesthetized with Somnifene was determined. The simultaneous registration of the coronary blood flow and of the peripheric blood flow was realized by the Rein thermostromuhr. The chloride of 3α[α-trimethylammonio-acetoxy] - 20 - bis-(nitratomethyl)-21-nitrato-5β-pregnane-11-one administered by venous methods at a dose of 200 gammas/kg. provoked a notable increase of coronary blood flow. This effect was progressive and durable. Doses of 500 gammas and 1000 gammas/kg. injected by venous methods provoked a vasodilatation even more pronounced.

Coronary spasms provoked by an injection of a solution of barium chloride were inhibited by the previous injection of 1000 gammas/kg. of the chloride of 3α-[α-trimethylammonio - acetoxy]-20-bis-(nitratomethyl)-21-nitrato-5β-pregnane-11-one.

E. *Action on the Carotidal Pressure and the Respiration in Dogs*

The action of the medicine on the carotidal pressure and on the respiration in dogs anesthetized with Somnifene (M.D.) was determined. It was observed that doses between 500 gammas/kg. and above i.e. the total dosage of 8.5 mg./kg. for each animal did not produce any effect on the arterial pressure and did not modify the action of the chemical mediators nor that of histamine.

DETERMINATION OF TOXICITY

A. *Acute Toxicity in Mice by Venous Methods*

The test of acute toxicity was effected on the mice of the Rockland strain weighing between 18 and 22 grams. The chloride of 3α-[α-trimethylammonio-acetoxy]-20-bis-(nitratomethyl)-21-nitrato-5β-pregnane-11-one was placed in solution at a concentration of 5 parts per 1000 in isotonic glucose serum and it was injected by intravenous methods to three groups of ten mice at doses of 10, 20 and 30 mg./kg. The following results were obtained:

| | 10 mg./kg. | 20 mg./kg. | 30 mg./kg. |
|---|---|---|---|
| Mortality | 1/10 | 7/10 | 10/10 |

The $DL_{50}$ calculated according to the graphic method of Tainter and Miller was 16 mg./kg.±2 based on the immediate mortality. There was no delayed mortality. Immediately after the injection, the mice showed a very intense state of excitation followed by convulsive movements leading to death at 20 and 30 mg./kg.

B. *Toxicity by Oral Methods*

The administration orally in mice of a dose of 200 mg./kg. caused in only one animal a respiratory difficulty of the dyspneic type and a quite characteristic assumption of the gait of a "hunting dog." On the day following the day of the test, the mice presented a perfectly normal behaviour. The product thus exercised no toxic effect on mice at this dose orally.

Various modifications of the process and compositions of the invention may be made without departing from the spirit or scope thereof and it is to be understood that the invention is to be limited only as defined in the appended claims.

I claim:

1. Quaternary ammonium compounds having the formula

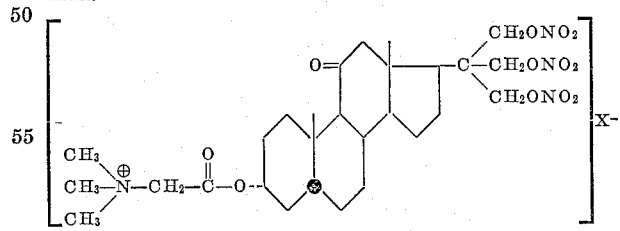

wherein X is a monovalent anion selected from the group consisting of a hydroxyl group and an anion of non-toxic organic and mineral acids.

2. The chloride of 3α-[α-trimethylammonio-acetoxy]-20-bis-(nitratomethyl)-21-nitrato-5β-pregnane-11-one.

3. A process for the preparation of quaternary ammonium compounds having the formula

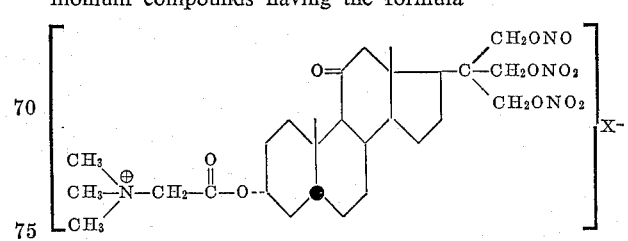

wherein X is a monovalent anion selected from the group consisting of a hydroxyl group and an anion of nontoxic organic and mineral acids, which comprises reacting 20 - bis - (nitratomethyl) - 21 - nitrato - 5β - pregnane-3α-ol-11-one with a compound selected from the group consisting of trimethyl-(methylcarbohalide)-ammonium hydroxide and its mineral and organic acid salts in the presence of a base to form a compound having the above formula and recovering the latter.

4. A process for the preparation of the chloride of 3α - [α - trimethylammonio - acetoxy] - 20 - bis - (nitratomethyl)-21-nitrato-5β-pregnane-11-one which comprises reacting 20 - bis - (nitratomethyl) - 21 - nitrato - 5β-pregnane-3α-ol-11-one with trimethyl-(methylcarbochloride)-ammonium chloride in the presence of a tertiary amine to form the chloride of 3α-[α-trimethylammonio-acetoxy] - 20 - bis - (nitratomethyl) - 21 - nitrato - 5β-pregnane-11-one and recovering the latter.

5. The process of claim 4 wherein the tertiary amine is pyridine.

6. Composition for the treatment of spasms of vascular, coronary and visceral orgin comprising 1 to 25 mg. of a quaternary ammonium compound having the formula

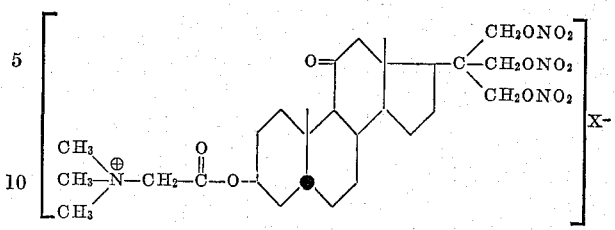

wherein X is a monovalent anion selected from the group consisting of a hydroxyl group and an anion of nontoxic organic and mineral acids and a pharmaceutical carrier.

7. The composition of claim 6 wherein the quaternary ammonium compound is the chloride of 3α-[α-trimethylammonio - acetoxy] - 20 - bis - (nitratomethyl) - 21-nitrato-5β-pregnane-11-one.

No references cited.